April 28, 1931.　　　　J. BETHUNE　　　　1,803,296
GEARING
Filed Dec. 23, 1929
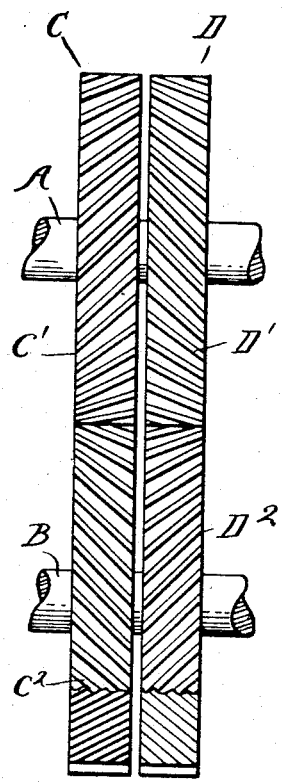
INVENTOR
John Bethune
BY Whittemore Hulbert
Whittemore & Belknap
ATTORNEYS Patented Apr. 28, 1931

1,803,296

UNITED STATES PATENT OFFICE

JOHN BETHUNE, OF LANSING, MICHIGAN, ASSIGNOR TO REO MOTOR CAR COMPANY, OF LANSING, MICHIGAN, A CORPORATION OF MICHIGAN

GEARING

Application filed December 23, 1929. Serial No. 416,063.

The invention relates to power transmission gearing and has for its object reduction in noise, particularly where the gearing is running at relatively high speeds. The invention is based upon a discovery, certain developments of which formed the subject matter of other applications for patents filed by me. This discovery is that where a plurality of simultaneously loaded equal ratio gear trains are interposed between a rotary drive shaft and a rotary driven shaft and where these trains have certain differential characteristics, the noise of operation particularly at high speed will be greatly reduced. In the former specific developments based on this basic principle the differential characteristics of the two trains have been of a mechanical nature such as slight differences in pitch or of transverse angle of the teeth or in tooth contour. In the present invention the differential characteristic is in the materials used or from which the gears are fashioned. Thus certain of the gears may be constructed from steel and others of bronze or other materials may be selected, such as different alloy steels, cast iron or nonmetallic bodies, the important factor being that the differential is such as to reduce the noise of operation.

One application of my improvement is in the construction of a variable speed transmission for motor cars, this being diagrammatically illustrated in the drawing in which a portion of such transmission is shown in side elevation.

As illustrated, A is the drive shaft and B the driven shaft of the transmission gearing. C and D are parallelly arranged equal ratio gear trains for communicating the rotation of the shaft A to the shaft B and which as specifically shown are oppositely inclined spiral gears together forming a herringbone gear. The train C is composed of intermeshing gear wheels C', C² which are formed of one material such as steel and the train D formed of the intermeshing gear wheels D', D² of another material such as bronze. If all of the gears of these two trains were made of the same material, either steel, bronze or anything else, there would be developed in operation a certain noise or tone increasing in pitch and volume with increased speed of operation. This noise is greatly reduced by the use of different materials in the gears of the equal ratio trains.

What I claim as my invention is:

1. The combination with a rotary drive member and a rotary driven member, of a plurality of equal ratio simultaneously loaded gear trains between said members, the gears of one of said trains being formed of different materials from the corresponding gears in the other of said trains.

2. The combination with a rotary drive member and a rotary driven member, of a plurality of equal ratio simultaneously loaded gear trains between said members, the corresponding gears of said trains being formed of materials having noise reducing differential characteristics.

3. The combination with a rotary drive member and a rotary driven member, and a plurality of equal ratio simultaneously loaded gear trains therebetween, the gears of one of said trains being formed of the same material and the gears of the other of said trains being formed of a different material, the differential characteristics of the two materials being noise reducing.

4. The combination with a rotary drive member and a rotary driven member, of a gear train therebetween having a plurality of equal ratio simultaneously loaded gear train portions between said members, corresponding gears in each of said gear train portions being formed of different materials having noise-reducing differential characteristics.

5. The combination with a rotary drive member and a rotary driven member, of a gear train therebetween having a plurality of equal ratio simultaneously loaded gear train portions between said members, each of the gears in one of said gear train portions being formed of a different material from the corresponding gear in the other gear train portion.

6. The combination with a rotary drive member and a rotary driven member, of a gear train therebetween having a plurality of equal ratio simultaneously loaded helical gear train portions between said members, corresponding gears in each of said gear train portions being formed of different materials having noise-reducing differential characteristics.

7. A pair of mating herringbone gears having the oppositely inclined teeth of each gear formed of different materials.

In testimony whereof I affix my signature.

JOHN BETHUNE.